US 8,677,115 B2

(12) United States Patent
Paris et al.

(10) Patent No.: US 8,677,115 B2
(45) Date of Patent: Mar. 18, 2014

(54) METHODS FOR VERIFYING SYSTEM INTEGRITY

(75) Inventors: Eric L. Paris, Raleigh, NC (US); Neil R. T. Horman, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 130 days.

(21) Appl. No.: 12/964,580

(22) Filed: Dec. 9, 2010

(65) Prior Publication Data

US 2012/0151206 A1 Jun. 14, 2012

(51) Int. Cl.
*H04L 29/06* (2006.01)

(52) U.S. Cl.
USPC ............................. 713/155; 713/194; 726/5

(58) Field of Classification Search
USPC ....................................... 713/155, 194; 726/5
See application file for complete search history.

(56) References Cited

U.S. PATENT DOCUMENTS

| 2002/0194496 | A1* | 12/2002 | Griffin et al. | 713/200 |
| 2004/0083296 | A1* | 4/2004 | Metral | 709/229 |
| 2006/0015732 | A1* | 1/2006 | Liu | 713/176 |
| 2006/0117184 | A1* | 6/2006 | Bleckmann et al. | 713/176 |
| 2007/0143629 | A1* | 6/2007 | Hardjono et al. | 713/189 |

OTHER PUBLICATIONS

"802.1X, IEEE Standard for Local and metropolitan area networks, Port-Based Network Access Control," IEEE Std 802.1X-2004, IEEE Computer Society, Dec. 13, 2004, 179 pages.

"Linux Integrity Subsystem," Downloaded from http://linux-ima.sourceforge.net/, Jul. 22, 2010, 6 pages.
Aboba, B. et al., "Extensible Authentication Protocol (EAP)," Network Working Group, Request for Comments: 3748, Standards Track, Jun. 2004, 68 pages.
"TCG Specification Architecture Overview," Specification Revision 1.4, Trusted Computing Group, Inc., Aug. 2, 2007, 54 pages.
"TPM Main Part 1 Design Principles Specification Version 1.2," Trusted Computing Group, Inc., Jul. 9, 2007, 182 pages.
"TPM Main Part 2 TPM Structures Specification Version 1.2," Trusted Computing Group, Inc., Jul. 9, 2007, 198 pages.
"TPM Main Part 3 Commands Specification Version 1.2," Trusted Computing Group, Inc., Jul. 9, 2007, 330 pages.

* cited by examiner

*Primary Examiner* — Yogesh Paliwal
(74) *Attorney, Agent, or Firm* — Lowenstein Sandler LLP (57) ABSTRACT

A request is received from a client for accessing a resource provided in a network, the request including credential data representing system integrity of at least one component running on the client. In response to the request, one or more credential identifiers identifying the credential data is transmitted to a management server that provisioned the client. Credential reference data is received from the management server based on the one or more credential identifiers. The client is authenticated based on a comparison of the credential data received from the client and credential reference data received from the management server.

21 Claims, 6 Drawing Sheets

METHODS FOR VERIFYING SYSTEM INTEGRITY

TECHNICAL FIELD

Embodiments of the present invention relate generally to secure computing. More particularly, embodiments of the invention relate to verification of system integrity for authentication purposes.

BACKGROUND

For security purposes, a user of a computer system, such as a notebook computer, is typically required to provide user authentication information to the computer system during a login process and to allow the user access to the computer system only in the event of the authentication information provided by the user matching corresponding authentication information stored in the computer system.

Typically, when a computer enters a network or access a resource on the network, network access control protocols are utilized to authenticate a user and/or a platform by an authentication entity to determine whether such a user and/or platform are entitled to enter the network or access a resource of the network.

A trusted platform module (TPM) for use in computing devices such as personal computers is known. The TPM techniques can be implemented in a variety of platforms including mobile platforms such as notebooks or handheld computing devices. Data measured by a TPM module of a computing device can be utilized by the authentication entity to authenticate the computing device in view of reference data. However, it is difficult for the authentication entity to maintain the reference data correctly representing system integrity of the computing device.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, when a user and/or client machine attempts to enter a network or access a resource (e.g., a Web site) available on the network, credentials captured or generated by a client machine (e.g., by a kernel of an operating system running within the client machine) can be used to authenticate the user and/or the client machine (e.g., data processing system such as desktop, laptop, handheld device, etc.) in view of credential reference data provided by a trusted source, in order to determine whether the client machine is entitled to enter the network and/or access the resource of the network. Such a trusted source may be an entity independent of an authentication component that authenticates the client machine, such as, for example, a management server that provisions or distributes certain system components such as software and/or hardware components currently running within the client machine. Since the management server provisions or distributes the system components to the client machine, the management server can certify and maintain in a trustworthy manner the credential reference data representing system integrity of at least one of the system components deployed in the client machine. That is, instead of having some other entities to maintain such reference data, a management server that provisions a client machine can centrally maintain and provide the reference data to an authentication entity for the purpose of authenticating the client machine.

Throughout this application, a TPM module collectively represents any kind of trusted platform modules, including a mobile TPM, where a TPM module can be implemented using software, firmware, hardware, or a combination thereof. The credentials may be generated by measuring or capturing integrity of certain software and/or hardware installed in the client machine.

In one embodiment, when a client machine enters a network or attempts to access a resource on the network, the client machine transmits one or more trusted platform (TP) credentials (also referred to as system integrity credentials) to an authentication entity for the purpose of authenticating the client machine to determine whether the client machine is entitled to enter the network and/or access the resource.

The one or more TP credentials may be embedded in an authentication packet to be transmitted to the authentication entity using a network access control (NAC) protocol, such as, for example, IEEE 802.1x compatible protocol. As a result, a client machine can be authenticated by the authentication entity based on system integrity of the client machine, which is represented by one or more TP credentials, in order to enter a network and/or access a resource of the network. The TP credentials may be measured or captured and generated by a client system and stored and/or signed by a TPM module of the client system. The TP credentials represent system integrity of one or more software and/or hardware components deployed in the client machine.

Figure 1:
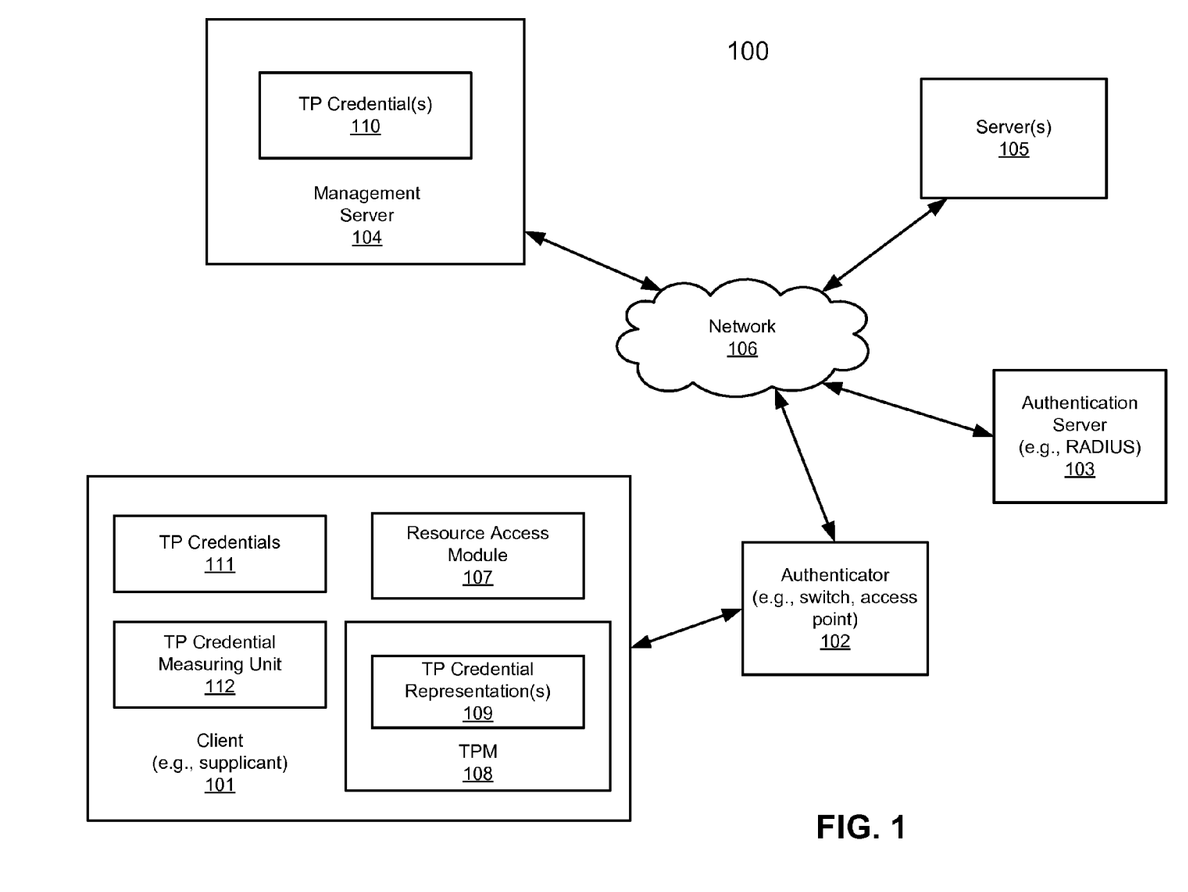
FIG. 1 is a block diagram illustrating a network system according to one embodiment of the invention.

FIG. 1 is a block diagram illustrating a network system according to one embodiment of the invention. Referring to FIG. 1, system 100 includes, but not limited to, a client 101 communicatively coupled to authenticator 102 to be authenticated by authenticator 102 and/or authentication server 103, in order to gain access to network 106. Client 101 may be any kind of computing devices, such as desktops, laptops, tablets, handheld devices (e.g., Smartphone), or a combination thereof. Authenticator 102 may be a network gateway device, a network switch or router, an access point (AP) of a wired and/or wireless network. Authentication server 103 may be a remote authentication and/or authorization server, such as, a remote authentication dial-in user service (RADUIS) server. Authenticator 102 and authentication server 103 may be separate entities (e.g., separate computer systems) and alternatively, they may be implemented as a single entity or server computer.

In one embodiment, at least some of the software and/or hardware components deployed in client 101 are provisioned or distributed by management server 104. For example, at least some software components (e.g., files) such as a kernel of an operating system (OS) running within client 101 may be provisioned and downloaded from management server 104 and installed at client 101. In one embodiment, management server 104 may be a Red Hat Network™ (RHN) server available from Red Hat®, Inc. of Raleigh, N.C. RHN is a family of systems management services operated by Red Hat that makes updates, patches, and bug fixes of packages, which may be in a format compatible with Red Hat package management (RPM) system. Other available features include the deployment of custom content to, and the provisioning, configuration, reporting, monitoring of client systems. Users of these operating systems can then invoke a software update program (e.g., Yellowdog Updater, Modified or YUM program) to download and install updates from RHN. In other embodiments, management server 104 is Windows™ update server, Mac OS™ server, or any other servers providing updates for a specific operating system (OS).

In one embodiment, client 101 includes one or more virtual machines (VMs), each corresponding to a guest OS, hosted by a host OS, also referred to as a hypervisor or virtual machine monitor (VMM). Alternatively, the VMs may be managed by a VMM running within authenticator 102 and/or authentication server 103. In one embodiment, management server 104 may be a virtualization management system, such as a virtualization server of a virtualization system available from Red Hat®, Inc., VMware, or Microsoft. In this situation, the VMM may operate as pass through to authenticator 102 or alternatively, the VMM of client 101 may operate as an authenticator.

In one embodiment, client 101 is implemented as a trusted platform conforming to the TPM Specification, version 1.2, defined by the Trusted Computing Group™. In one embodiment, client 101 includes TPM module 108, which may be implemented in hardware, software, or a combination of both, having one or more TP credential representations 109 stored therein, where TP credential representations 109 represent one or more TP credentials 111. TP credentials 111 may be measured or recorded by TP credential measuring unit 112 as metrics (e.g., data or values representing integrity of components measured) (e.g., during an initialization process such boot time or dynamically at runtime) of client 101. TP credentials 111 may be stored in a secured or protected storage area such as the system memory or hard drive. According to one embodiment, TP credentials 111 and/or the associated representations 109 may be used by authentication server 103 to authenticate client 101 in view of credential reference data 110 provided by management server 104 (e.g., TP credentials measured or collected by the management server when the corresponding components being distributed), when client 101 enters network 106 and/or accesses a resource such as servers 105 of network 106. Network 106 may be a local area network (LAN) or a wide area network (WAN), wired or wireless.

TPM 108 offers facilities for the secure generation of cryptographic keys, and limitation of their use, in addition to a hardware pseudo-random number generator. It also includes capabilities such as remote attestation, binding and sealed storage. "Remote attestation" creates a nearly unforgeable hash key summary of the hardware and software configuration. The extent of the summary of the software is decided by the program encrypting the data. This allows a third party to verify that the software has not been changed. "Binding" encrypts data using the TPM endorsement key, a unique RSA key burned into the TPM chip during its production, or another trusted key descended from it. "Sealing" encrypts data similar to binding, but in addition specifies a state in which the TPM must be in order for the data to be decrypted (unsealed).

A TPM can be used to authenticate hardware devices. Since each TPM chip has a unique and secret RSA key burned in as it is produced, it is capable of performing platform authentication. For example, it can be used to verify that a system (e.g., client 101) seeking access (to authenticator 102) is the expected system. Trust is the expectation that a device will behave in a particular manner for a specific purpose. A trusted platform may provide at least one of basic features: protected capabilities, integrity measurement, and integrity reporting. Protected capabilities are a set of commands with exclusive permission to access shielded locations. Shielded locations are places (e.g., memory, register, etc.) where it is safe to operate on sensitive data; data locations that can be accessed only by protected capabilities. Attestation is the process of vouching for the accuracy of information. External entities can attest to shielded locations, protected capabilities, and roots of trust.

Integrity measurement is the process of obtaining metrics of platform characteristics that affect the integrity (trustworthiness) of a platform and putting digests of those metrics in platform configuration registers (PCRs), which may be implemented as in volatile or non-volatile storage. The starting point of measurement is referred to as the root of trust for measurement. A static root of trust for measurement begins measuring from a well-known starting state such as a power on self-test. A dynamic root of trust for measurement transitions from an un-trusted state to one that is trusted. Integrity reporting is the process of attesting to integrity measurements recorded in PCRs.

Measurement data describes properties and characteristics of the measured components (e.g., hardware and/or software components). It is the responsibility of the measurement kernel implementer to understand the syntax and semantics of measured fields in sufficient detail to produce an encoding suitable for measurement event consumers. Verification of measurement events requires recreation of the measurement digest and a simple comparison of digest values (using PCR value as one of the comparator, as defined in "TCG Specification Architecture Overview", Rev. 1.4, published in 2007. Again, it will be appreciated that a TPM module can be implemented in software, firmware, hardware, or a combination thereof. A TPM module can be implemented in software completely and executed in a random-access memory (RAM) of client 101. Such a software-implemented TPM may operate according to at least a portion of the TCG specification set forth above. The keys and other confidential information associated with the TPM module can be stored in a secured storage location of a storage device almost exclusively accessed by the TPM module.

Referring back to FIG. 1, in one embodiment, TP credentials 111 are referred to those credential data measured or recorded and stored in a secured storage location of client 101

(e.g., system memory or hard drive). TP credential representations representing TP credentials 111 may be computed and stored within TPM module 108 such as PCRs of TPM module 108 or some other secured storage locations in a storage device of client 101. TP credentials 111 may include at least one of endorsement credential, conformance credential, platform credential, validation credential, and identity credential set forth in the above TPM specification.

In one embodiment, TP credentials 111 may be measured by measuring unit 112 based on a list of one or more files currently installed within client 101, where measuring unit 112 may be implemented as part of the kernel of an operating system running within client 101. In one embodiment, for each file in the list of files that represent the integrity of client 101, measuring unit 112 is configured to performed a predetermined mathematical operation on the associated file image. For example, measuring unit 112 may perform a hash operation according to a variety of hash algorithms such as SHA-1 or MD-5 algorithm. In addition, measuring unit 112 is configured to extend or update one or more TP credential representations 109 based on TP credentials 111 (e.g., the hash values of the files) by performing a predetermined operation or function, where TP credential representations 109 may be stored in the PCRs of TPM 108.

For example, for the purpose of illustration as indicated in the table below, it is assumed that the list of files includes files "vmlinux," "ld.so," and "init." It is also assumed that a single credential representation is utilized herein; however, in other embodiments, multiple representations may also be utilized.

| Filenames | Kernel Hash Values | PCR Values |
|-----------|--------------------|-----------| 
| vmlinux   | 11011              | 11011     |
| ld.so     | 10101              | 01110     |
| init      | 11100              | 10010     |

In this example, starting from file "vmlinux," measuring unit 112 is configured to perform a predetermined hash operation on an image of the file, which generates a binary value 11011. The binary value of 11011 is then stored in a secured storage location such as system memory. In addition, measuring unit 112 updates the PCR value stored within TPM 108 by performing a predetermined operation, in this example, an XOR operation, on the hash value of 11011, which generates a PCR value of 11011 (since the initial PCR value is presumed to be zero). For file "ld.so", it is assumed that the hash value is computed as 10101 and the PCR value is updated by performing an XOR of 10101 and the existing PCR value of 11011, which generates a new PCR value of 01110. Similarly, for file "init," it is assumed that the hash value is computed as 11100. The final PCR value is computed by XORing the has value of 11100 and the current PCR value of 01110, which generates the final PCR value of 10010.

According to one embodiment, when client 101 attempts entering network 106 or accessing a resource such as servers 105 of network 106, resource access module 107 retrieves one or more of TP credentials 111 from the secured storage location and credential representations 109 from TPM 108 and transmits one or more of TP credentials 111 and representations 109 to authentication server 103 (optionally via authenticator 102) for the purposes of being authenticated by authentication server 103. In response to TP credentials 111 and representations 109 received from client 101, an authentication module of authentication server 103 is configured to authenticate the received TP credentials 111 and representations 109 in view of TP credentials 110 (e.g., credential reference data) provided by management server 104. Note that credential representations 109 may be signed with a TPM attestation key and credential representations 109 may be used to verify the hash values by the server. If the received one or more of TP credentials 111 match the counterparts of TP credentials 110, client 101 may be authenticated successfully and client 101 may be allowed to access network 104 and/or resources of network 104. Otherwise, the access may be denied.

In one embodiment, management server 104 is configured to maintain a list of TP credentials 110 for software components (e.g., kernel files of an operating system) that have been deployed in client 101. For example, according to one embodiment, when a file is distributed to client 101 for deployment, management server 104 may measure or capture certain data representing a credential of the file and store the credential in a secured storage, locally or remotely with respect to management server 104. In one embodiment, a credential of a file is represented by a hash value, which may be generated by hashing a file image of the file using any of a variety of hash algorithms, such as, for example, SHA-1 or MD-5, etc. The hash value is then stored in a storage as part of credentials 110, locally or remotely. The hash value of a file may be stored in a data structure and referenced or identified by a file identifier (e.g., filename) of the file. Alternatively, such a credential may be generated by client 101 when the file is being installed and transmitted from client 101 to management server 104, for example, via a secured network connection.

According to one embodiment, when client 101 initializes (e.g., reboots or powers up), credential measuring unit 112 is configured to measure the integrity of at least some files currently deployed within client 101. Similarly, for each of the files to be measured, a hash value is generated by dynamically hashing the file using a predetermined hash algorithm, which may be previously agreed upon between management server 104 and client 101. The hash values for the files are stored as part of credentials 111 in client 101 and identified by the corresponding file identifiers (e.g., filenames) of the files. In addition, credential representations 109 are generated based on credentials 111 and stored in one or more PCRs within TPM 108.

Subsequently, when client 101 attempts entering network 106 or accessing resources, such as Web sites, data stored in storage, certain network segments, communications channels, etc., provided by servers 105, according to one embodiment, resource access module 107 transmits one or more of credentials 111 and representations 109 to authentication server 103 (optionally via authenticator 102). In response, authentication server 103 contacts management server 104 to obtain the corresponding credential counterparts 110. Authentication server 103 is configured to compare counterparts of credentials 111 and credentials 110 for the purpose of authenticating client 101. If the counterparts of credentials 111 and 110 match, client 101 is allowed to access network 106 and/or servers 105; otherwise, client 101 is denied.

In one embodiment, when a credential of a file is represented by a hash value of the file, authentication server 103 may transmit a file identifier (e.g., filename) for the file to management server 104. In response, management server 104 retrieves the corresponding hash value from a repository based on the file identifier received from authentication server 103 and returns the hash value back to authentication server 103. Authentication server 103 can then compare the hash value received from client 101 and the hash value received from management server 104 to determine whether integrity of the file has been compromised. The above process may be iteratively performed by authentication server 103 for a list of multiple files that are currently deployed at client 101.

In one embodiment, TP credentials used for authentications may be exchanged using a network access control protocol such as the IEEE 802.1x protocol. The IEEE 802.1x standard offers an additional method for controlling network access utilizing port control. Port-based network access control makes use of the physical access characteristics of an IEEE 802 LAN infrastructure in order to provide a means of authenticating and authorizing devices attached to a switch port that has point-to-point connection characteristics. IEEE 802.1x authentication involves three parties: a supplicant, an authenticator, and an authentication server. The supplicant is a client device (such as a laptop) that wishes to attach to the LAN or wireless LAN (WLAN)—though the term "supplicant" is also used interchangeably to refer to the software running on the client that provides credentials to the authenticator. The authenticator is a network device, such as an Ethernet switch or wireless access point; and the authentication server is typically a host running software supporting the RADIUS and EAP protocols.

Authenticator 102 acts like a security guard for a protected network. The supplicant (i.e., client device) is not allowed access through the authenticator to the protected side of the network until the supplicant's identity has been validated and authorized. With IEEE 802.1x port-based authentication, the supplicant provides credentials, such as user name/password or digital certificate, to the authenticator, and the authenticator forwards the credentials to the authentication server for verification. If the authentication server determines the credentials are valid, the supplicant (client device) is allowed to access resources located on the protected side of the network.

On detection of a new supplicant, the port on the switch (e.g., authenticator) is enabled and set to the "unauthorized" state. In this state, only the IEEE 802.1x traffic is allowed; other traffic, such as dynamic host configuration protocol (DHCP) and hypertext transfer protocol (HTTP), is dropped. To initiate authentication the authenticator will periodically transmit EAP-Request Identity frames to a special layer-2 address on the local network segment. The supplicant listens on this address, and on receipt of the EAP-Request Identity frame it responds with an EAP-Response Identity frame containing an identifier for the supplicant such as a User ID. The authenticator then encapsulates this identity response in a RADIUS Access-Request packet and forwards it on to the authentication server. The supplicant may also initiate or restart authentication by sending an EAP over LAN (EAPOL)-Start frame to the authenticator, which will then reply with an EAP-Request Identity frame. Note that for the purpose of authenticating a client machine, the measurements representing the system integrity is utilized while a RADIUS is typically used when authenticating a user. The measurements may be encapsulated within IEEE 802.1x frames and transmitted to the server for the purpose of validation. Embodiments of the invention can be utilized to authenticate a client machine in conjunction with authentication of a user via RADIUS.

Figure 2:
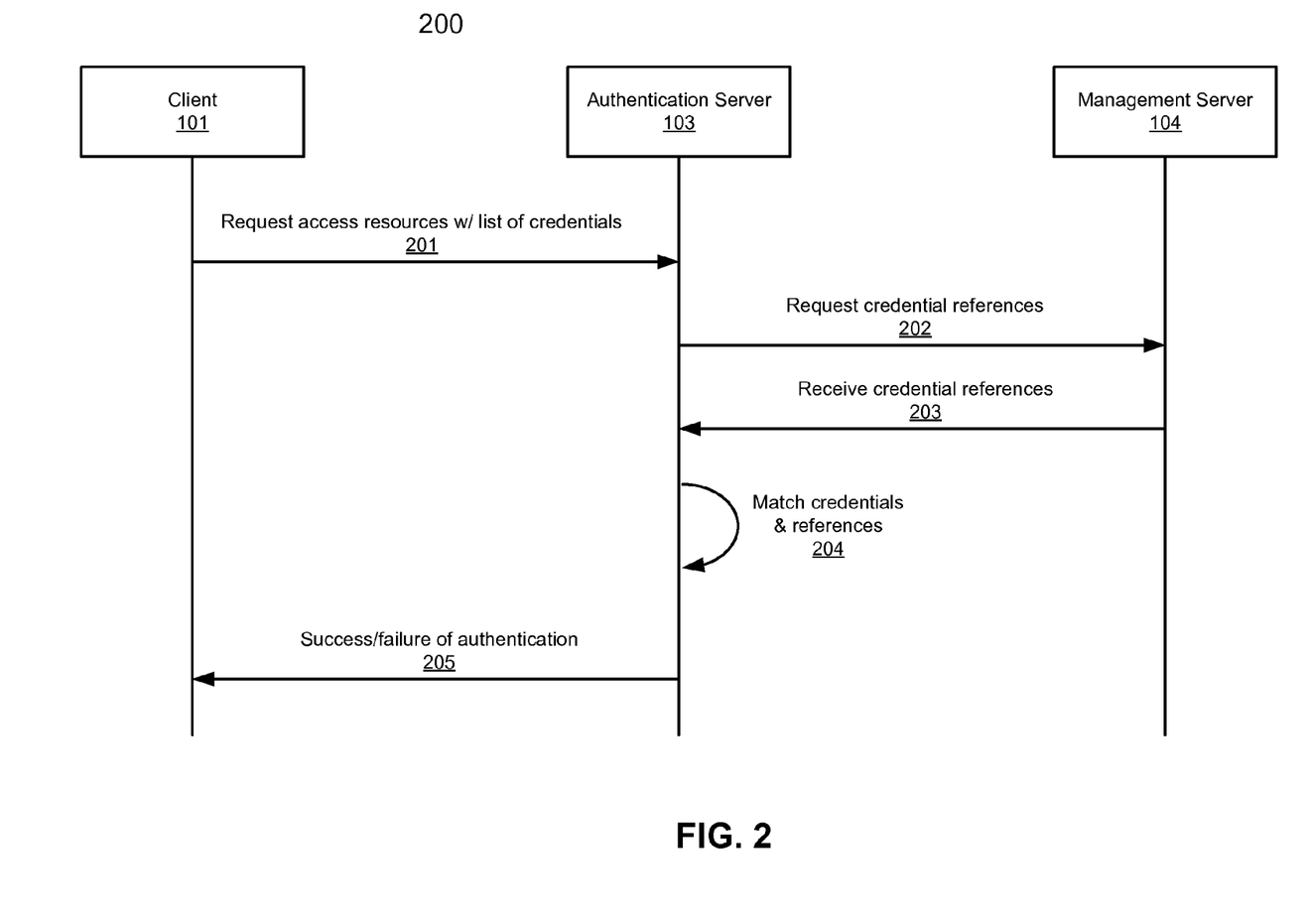
FIG. 2 is a flow diagram illustrating an authentication method according to one embodiment of the invention.

FIG. 2 is a flow diagram illustrating an authentication method according to one embodiment of the invention. For example, method 200 may be performed between client 101, authentication server 103 (optionally via authenticator 102), and management server 104 of FIG. 1. Referring to FIG. 2, initially when client 101 attempts entering a network or accessing a resource (e.g., Web site) of a network, client 101 and authentication server 103 negotiate an authentication method (e.g., using IEEE 802.1x protocols). Once they agree upon a particular authentication method, during transaction 201, client 101 transmits a list of one or more credentials to authentication server 103 for the purpose of authenticating client 101. The one or more credentials represent system integrity of one or more components running within client 101. In one embodiment, a credential may include a file identifier such as a filename and a first hash value generated within client 101 (e.g., by TP credential measuring module 111 of client 101) by hashing the file image of the file using a predetermined hash algorithm. The first hash value may be generated during initialization of the client (e.g., boot time). In response, during transaction 202, for each of the credentials received from client 101, authentication server 103 requests the corresponding credential references from management server 104, which may provision or distribute the one or more components running within client 101. In one embodiment, authentication server 203 may transmit the file identifier received from client 101 to management server 104.

In response, during transaction 203, management server 104 retrieves a second hash value associated with the file identifier from a database and transmits the second hash value to authentication server 103. The second hash value may be generated by management server 104 or an entity associated with the management server 104 using the predetermined hash algorithm, when the corresponding file was provisioned and deployed in client 101. During transaction 204, authentication server 103 compares the first hash value with the second hash value to determine whether the corresponding file is the same file that was originally provisioned or distributed. Note that the TP credentials may be transmitted from client 201 to authentication server 103 via single transaction 201. Alternatively, operations involved in transactions 201-204 may be repeatedly performed for multiple credentials for the purpose of verifying a list of multiple components. For example, in each iteration, one or more TP credentials are transmitted from client 101 to server 102 for verifying the associated one or more components. After verifying those components, server 102 may request client 101 to transmit TP credentials for subsequent one or more components for verification and so on, until all of the required components have been verified. Based on the comparison, during transaction 205, a success or failure is returned to client 101, indicating whether client 101 has been authenticated successfully.

Figure 3:
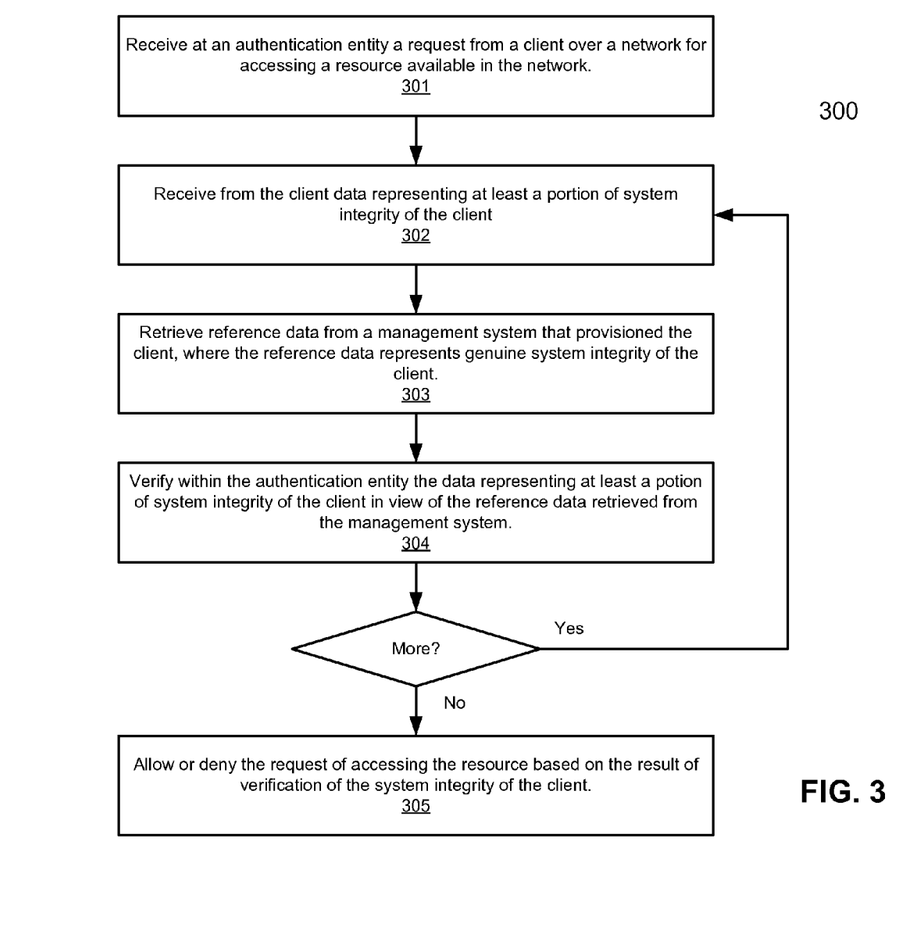
FIG. 3 is a flow diagram illustrating a method for authenticating a client machine according to one embodiment of the invention.

FIG. 3 is a flow diagram illustrating a method for authenticating a client machine according to one embodiment of the invention. For example, method 300 may be performed by authentication server 103 of FIG. 1. Referring to FIG. 3, at block 301, an authentication server receives a request from a client over a network for accessing a resource of the network. At block 302, the authentication server receives from the client data representing integrity of at least some system components of the client. At block 303, the authentication server communicates with a trusted source to retrieve reference data representing genuine system integrity of the client without the possibility of being compromised. Such a trusted source may be a management server that originally provisioned certain system components of the client. At block 304, the authentication server verifies the system integrity of the client by comparing the data received from the client and the reference data received from the trusted source. If the credentials are exchanged in segments, the operations involved in blocks 302-304 may be iteratively performed. Based on the comparison, at block 305, the authentication server allows or denies the client the request for accessing the resource.

Figure 4:
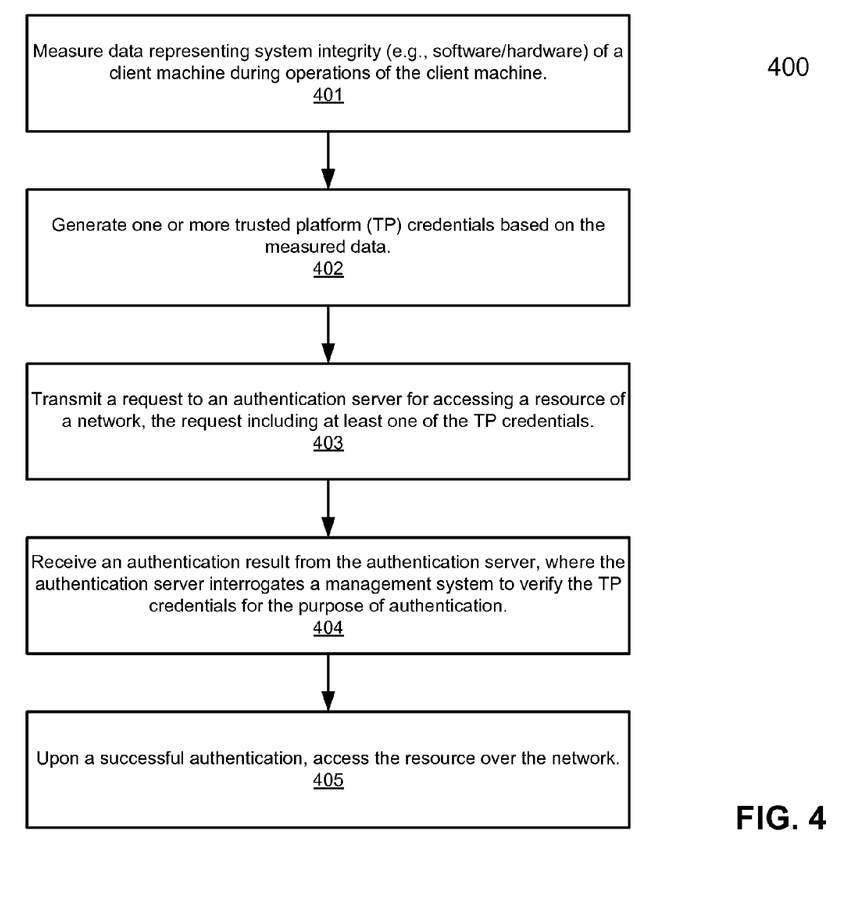
FIG. 4 is a flow diagram illustrating a method for accessing a resource of a network according to one embodiment of the invention.

FIG. 4 is a flow diagram illustrating a method for accessing a resource of a network according to one embodiment of the invention. Method 400 may be performed by client 101 of FIG. 1. Referring to FIG. 4, at block 401, data representing system integrity of a client machine is measured during operations of the client machine. The data may be measured (e.g., hashing an image of a software component and/or obtaining an identifier of a hardware component) by credential measuring module (e.g., kernel of an operating system) of the client machine during an initialization of the client machine. At block 402, one or more TPM credentials are generated based on the measurements and optionally representations of the credentials may also be generated and stored in the TPM. At block 403, processing logic transmits a request to an authentication entity for accessing a resource of a network, where the request includes at least one of the TP credentials and optional representations of the TP credentials. At block 404, an authentication result is received from the authentication entity, where the authentication entity interrogated a management server that provisioned the client machine to verify the TP credentials in order to generate the result. Upon successful authentication, at block 405, the client machine can access the resource over the network.

According to some embodiments, the techniques described above can also be applied to a client having a virtualized operating environment. A client may include one or more virtual operating environments such as virtual machines (VMs) operating therein. Each VM may maintain its own TP credential (e.g., by a virtual TPM module) and may be individually authenticated by an authentication server based on the authentication of the corresponding TP credential (e.g., virtual TP credential). As a result, the VMs can be isolated for security purposes. Further, a host OS can operate as an authenticator to the guest virtual machines it hosts.

Figure 5:
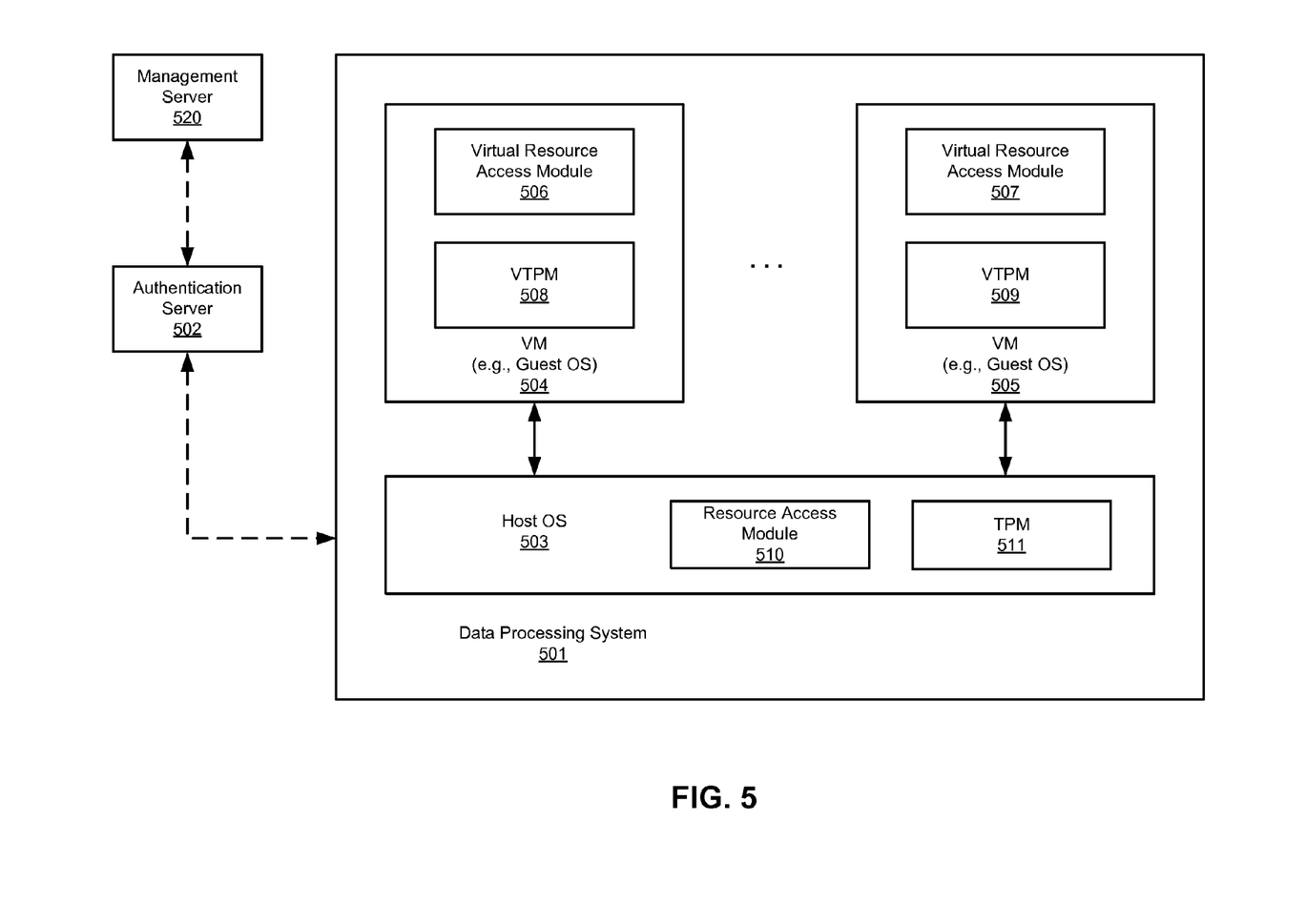
FIG. 5 is a block diagram illustrating a virtualized system according to one embodiment of the invention.

FIG. 5 is a block diagram illustrating a virtualized system according to one embodiment of the invention. For example, system 501 may represent client 101; system 502 may represent authenticator 102 and/or authentication server 103; and system 520 may represent management server 104 of FIG. 1. Referring to FIG. 5, system 501 includes one or more virtual machines 504-505, which can be implemented in a form of a guest OS, hosted by a host OS 503. Each of VMs 504-505 can host an application (e.g., network access modules 506-507). Multiple guest OSes (e.g., guest OSes 504-505) and the associated virtual machines may be controlled by host OS 503. System 501 may be communicatively coupled to authentication server 502 (optionally via an authenticator) and management server 520 such as a virtualization management server. Guest OSes 504-505 may be provisioned by management sever 520.

Typically, a host OS represents a virtual machine monitor (VMM) (also referred to as a hypervisor) for managing the hosted virtual machines. A guest OS may be of the same or different types with respect to the host OS. For example, a guest OS may be a Windows® operating system from Microsoft® Corporation of Redmond, Wash. and a host OS may be a LINUX® operating system available from Red Hat, Inc. of Raleigh, N.C. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

According to one embodiment, host OS 503 includes, but not limited to, resource access module 510 and a TPM module 511. TPM module 511 may represent a TPM chip available from a variety of vendors. Alternatively, TPM module 511 may be a software-implemented module or a combination of software and hardware. When host OS 503 enters a network or access a resource of the network, resource access module 510 transmits one or more TP credentials retrieved from TPM module 511 to authentication server 502 to be authenticated by authentication server 502. Note that a VMM that manages VMs 504-505 may be implemented as part of authentication server 502. Once host OS 503 has been authenticated by authentication server 502, certain components of host OS 503 can access the network. Similarly, each of VMs 504-505 includes, but not limited to, resource access module 506-507 and a virtual TPM module (e.g., VTPMs 508-509) to allow each of the VMs 504-505 to be individually and independently authenticated by authentication server 502 based on their respective TP credentials retrieved from their respective VTPM modules 508-509 in view of the credential references obtained from management server 520. In one embodiment, the network connection may be provided to guests 504-505 virtually via a software bridge which may be implemented in the kernel of host OS 503. In this situation, the network access control protocol such as IEEE 802.1X may be shuttled across the software bridge such that each VM guest can be independently authenticated.

According to one embodiment, VTPM 504-505 may be implemented as a virtual instance which may be spawned from a base virtual TPM module (not shown). Alternatively, a VTPM may be derived from TPM 511. A TPM may include a common portion of components that are common to all TPMs 508-509 and 511, and a specific portion that represents certain specific characteristics and/or integrity of its respective VM or OS. Note that although TPM 511 may be implemented in a hardware TPM chip (not shown), each of the VTPM 504-505 may be stored in a specific or secured storage associated with its VM (not shown), either volatile (e.g., random-access memory or RAM) or non-volatile (e.g., hard drive). In this embodiment, certain security measures should be in place for accessing the VTPMs.

Figure 6:
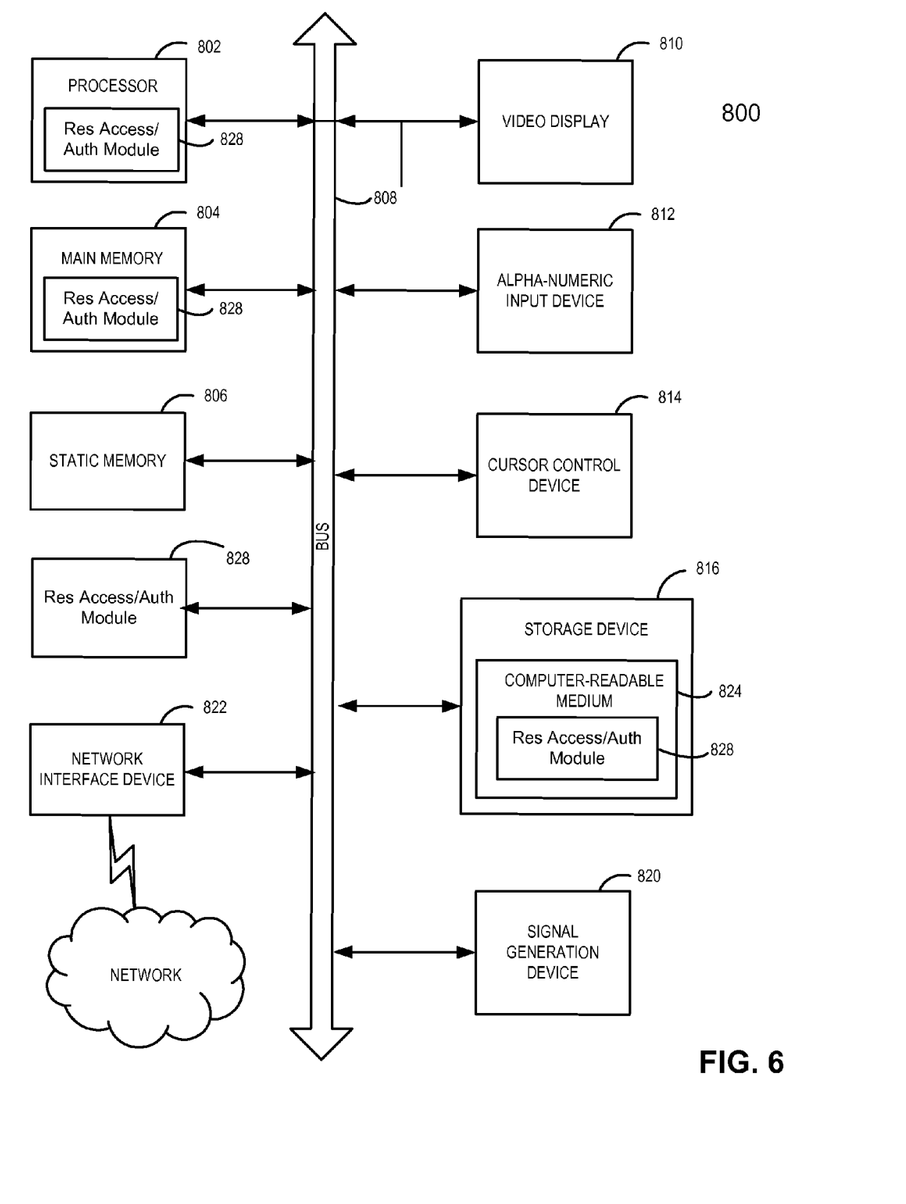
FIG. 6 illustrates a data processing system which may be used with an embodiment of the invention.

FIG. 6 illustrates a data processing system which may be used with an embodiment of the invention. For example, system 800 may represent a client system, an authenticator, an authentication server, and/or a management server as described above. Referring to FIG. 6, system 800 may present a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 828 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., module 828) embodying any one or more of the methodologies or functions described herein. The module 828 may also reside, completely or at least partially, within the main memory 804 and/or within the processor 802 during execution thereof by the computer system 800, the main memory 804 and the processor 802 also constituting machine-accessible storage media. The module 828 may further be transmitted or received over a network via the network interface device 822.

The computer-readable storage medium 824 may also be used to store the desktop 101 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
receiving, by a processor device at an authentication server system, a request from a client device to access a resource in a network, wherein the request comprises credential data that represents system integrity of a component running on the client device;
in response to receiving the request, transmitting to a management server system that is separate from the authentication server system, by the processor device, a credential identifier that identifies the credential data, wherein the management server system provisions the component to the client device and tracks deployment of the component to the client device;

receiving from the management server system, by the processor device, credential reference data in view of the credential identifier, wherein the credential reference data represents integrity of the component;

determining, by the processor device, that the credential data from the client device matches the credential reference data from the management server system; and in response to determining that the credential data matches the credential reference data, allowing the client device to access the resource.

2. The method of claim 1, wherein the credential data is measured by a credential measuring unit and is represented by a credential representation signed by a trusted platform module (TPM) of the client device, and wherein the TPM is implemented in hardware compatible with a TPM specification set forth by a trusted computing group (TCG) governing body.

3. The method of claim 2, wherein the credential data comprises at least one of an endorsement credential, a conformance credential, a platform credential, a validation credential, or an identity credential.

4. The method of claim 2, wherein the component comprises a file, wherein the credential identifier comprises a file identifier that identifies the file, wherein the credential data comprises a hash value that represents integrity of the file, wherein the credential reference data comprises a reference hash value associated with the file identifier, and wherein determining that the credential data from the client device matches the credential reference data comprises comparing the hash value to the reference hash value.

5. The method of claim 4, wherein the hash value is generated by the credential measuring unit during initialization of the client device by hashing a file image of the file at the client device.

6. The method of claim 1, wherein the client device comprises a host operating system (OS) that hosts a guest OS of a virtual machine, wherein the component comprises a portion of the host OS, and wherein the credential data indicates integrity of the portion of the host OS.

7. The method of claim 1, wherein the client device comprises a host operating system (OS) that hosts a guest OS of a virtual machine, wherein the component comprises a portion of the guest OS, and wherein the credential data indicates integrity of the portion of the guest OS.

8. A non-transitory computer-readable medium having instructions stored therein, which when executed by a processor device, cause the processor device to perform operations comprising:

receiving, by the processor device at an authentication server system, a request from a client device to access a resource in a network, wherein the request comprises credential data that represents system integrity of a component running on the client device;

in response to receiving the request, transmitting to a management server system that is separate from the authentication server system, by the processor device, a credential identifier that identifies the credential data, wherein the management server system provisions the component to the client device and tracks deployment of the component to the client device;

receiving from the management server system, by the processor device, credential reference data in view of the credential identifier, wherein the credential reference data represents integrity of the component;

determining, by the processor device, that the credential data from the client device matches the credential reference data from the management server system; and in response to determining that the credential data matches the credential reference data, allowing the client device to access the resource.

9. The non-transitory computer-readable medium of claim 8, wherein the credential data is measured by a credential measuring unit and is represented by a credential representation signed by a trusted platform module (TPM) of the client device, and wherein the TPM is implemented in hardware compatible with a TPM specification set forth by a trusted computing group (TCG) governing body.

10. The non-transitory computer-readable medium of claim 9, wherein the credential data comprises at least one of an endorsement credential, a conformance credential, a platform credential, a validation credential, or an identity credential.

11. The non-transitory computer-readable medium of claim 9, wherein the component comprises a file, wherein the credential identifier comprises a file identifier that identifies the file, wherein the credential data comprises a hash value that represents integrity of the file, wherein the credential reference data comprises a reference hash value associated with the file identifier, and wherein determining that the credential data from the client device matches the credential reference data comprises comparing the hash value to the reference hash value.

12. The non-transitory computer-readable medium of claim 11, wherein the hash value is generated by the credential measuring unit during initialization of the client device by hashing a file image of the file at the client device.

13. The non-transitory computer-readable medium of claim 8, wherein the client device comprises a host operating system (OS) that hosts a guest OS of a virtual machine, wherein the component comprises a portion of the host OS, and wherein the credential data indicates integrity of the portion of the host OS.

14. The non-transitory computer-readable medium of claim 8, wherein the client device comprises a host operating system (OS) that hosts a guest OS of a virtual machine, wherein the component comprises a portion of the guest OS, and wherein the credential data indicates integrity of the portion of the guest OS.

15. A system comprising:

a network interface device; and a processor device at an authentication server system to:

receive, via the network interface device, a request from a client device to access a resource in a network, wherein the request comprises credential data that represents system integrity of a component running on the client device, in response to the receipt of the request, transmit to a management server system that is separate from the authentication server system, via the network interface device, a credential identifier that identifies the credential data, wherein the management server system provisions the component to the client device and tracks deployment of the component to the client device, receive from the management server system, via the network interface device, credential reference data in view of the credential identifier, wherein the credential reference data represents integrity of the component, determine that the credential data from the client device matches the credential reference data from the management server system, and in response to the determination that the credential data matches the credential reference data, allow the client device to access the resource.

16. The system of claim 15, wherein the credential data is measured by a credential measuring unit and is represented by a credential representation signed by a trusted platform module (TPM) of the client device, and wherein the TPM is implemented in hardware compatible with a TPM specification set forth by a trusted computing group (TCG) governing body.

17. The system of claim 16, wherein the credential data comprises at least one of an endorsement credential, a conformance credential, a platform credential, a validation credential, or an identity credential.

18. The system of claim 16, wherein the component comprises a file, wherein the credential identifier comprises a file identifier that identifies the file, wherein the credential data comprises a hash value that represents integrity of the file, wherein the credential reference data comprises a reference hash value associated with the file identifier, and wherein the processor device is to determine that the credential data from the client device matches the credential reference data by a comparison of the hash value to the reference hash value.

19. The system of claim 18, wherein the hash value is generated by the credential measuring unit during initialization of the client device by hashing a file image of the file at the client device.

20. The system of claim 15, wherein the client device comprises a host operating system (OS) that hosts a guest OS of a virtual machine, wherein the component comprises a portion of the host OS, and wherein the credential data indicates integrity of the portion of the host OS.

21. The system of claim 15, wherein the client device comprises a host operating system (OS) that hosts a guest OS of a virtual machine, wherein the component comprises a portion of the guest OS, and wherein the credential data indicates integrity of the portion of the guest OS.

* * * * *